(12) United States Patent
Duan et al.

(10) Patent No.: US 9,687,788 B2
(45) Date of Patent: Jun. 27, 2017

(54) FORWARD OSMOSIS PROCESS

(71) Applicant: KING ABDULLAH UNIVERSITY OF SCIENCE AND TECHNOLOGY, Thuwal (SA)

(72) Inventors: Jintang Duan, Thuwal (SA); Ingo Pinnau, Thuwal (SA); Eric Litwiller, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 334 days.

(21) Appl. No.: 13/905,659

(22) Filed: May 30, 2013

(65) Prior Publication Data

US 2013/0319943 A1 Dec. 5, 2013

Related U.S. Application Data

(60) Provisional application No. 61/653,942, filed on May 31, 2012.

(51) Int. Cl.
*B01D 61/02* (2006.01)
*B01D 61/00* (2006.01)

(52) U.S. Cl.
CPC ........ *B01D 61/002* (2013.01); *B01D 2311/04* (2013.01); *B01D 2311/14* (2013.01)

(58) Field of Classification Search
CPC .................................................. B01D 61/002
USPC ...... 210/767, 321.6, 321.72, 321.75, 321.84, 210/500.1, 500.21, 500.27
See application file for complete search history.

(56) References Cited

U.S. PATENT DOCUMENTS

2006/0144789 A1* 7/2006 Cath et al. ............... 210/641
2007/0246426 A1* 10/2007 Collins ................. C09K 8/528 210/651
2012/0118827 A1* 5/2012 Chang ................. B01D 61/002 210/650

OTHER PUBLICATIONS

Xu et al. (J of Membr. Sci., 348 (2010) 298-309).*

* cited by examiner

*Primary Examiner* — Allison Fitzsimmons
(74) *Attorney, Agent, or Firm* — Smith, Gambrell & Russell, LLP

(57) ABSTRACT

A process that can alleviate the internal concentration polarization and can enhance membrane performance of a forward osmosis system includes the steps of passing a fluid in a forward osmosis system from a feed solution with a first osmotic pressure, through a membrane into a draw solution comprising a draw solute with a second osmotic pressure, where the first osmotic pressure is lower than the second osmotic pressure, the membrane includes an active layer and a support layer, and the membrane is oriented such that the active layer of the membrane faces a draw side, and the support layer faces a feed side; and applying an external force to the fluid on the feed side of the membrane.

15 Claims, 11 Drawing Sheets

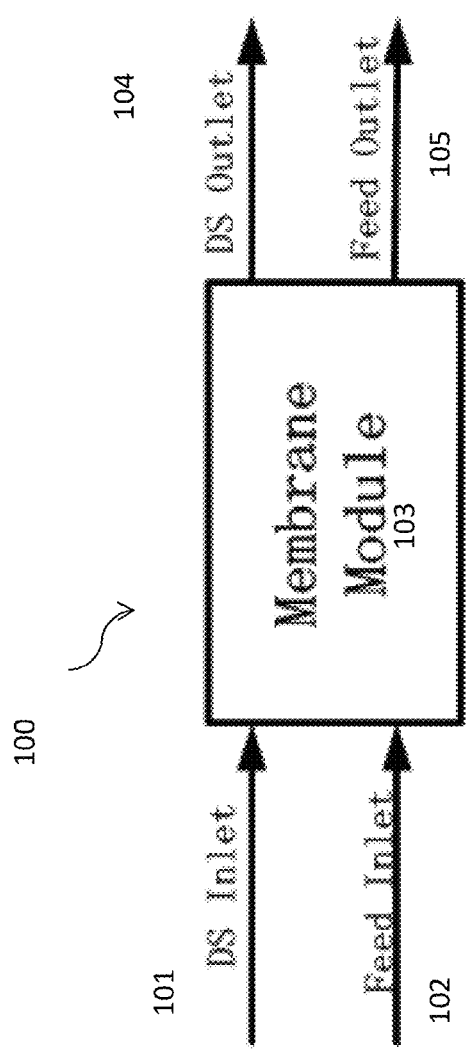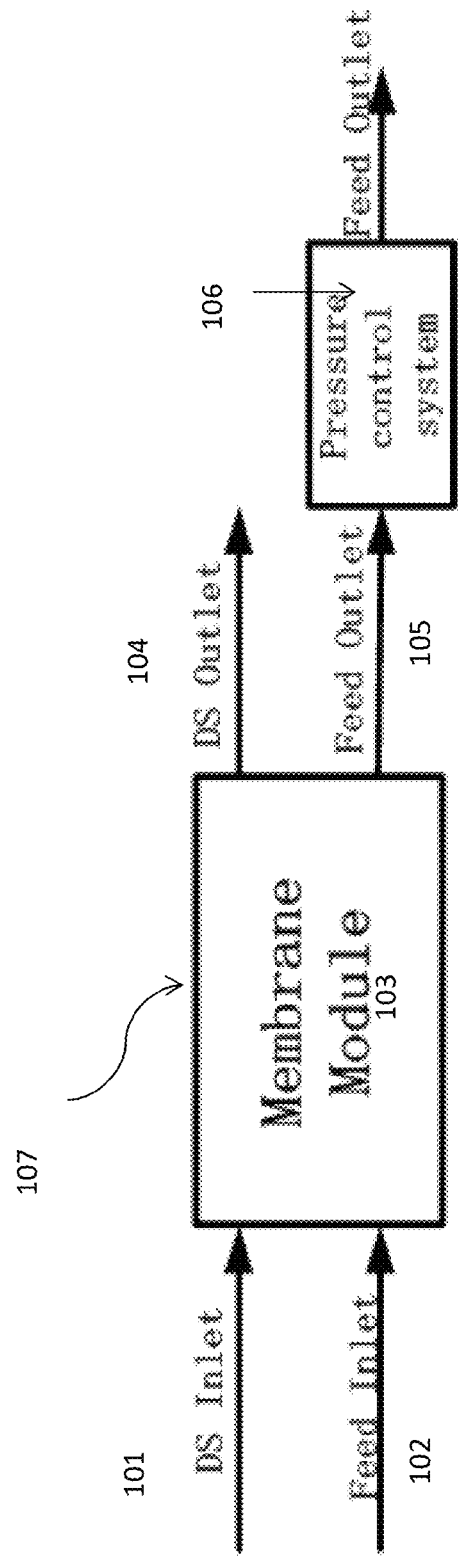
Fig. 1(a)
Fig. 1(b)

FORWARD OSMOSIS PROCESS

CLAIM FOR PRIORITY

This application claims priority to U.S. Patent Application No. 61/653,942, filed May 31, 2012, which is hereby incorporated by reference in its entirety.

TECHNICAL FIELD

This invention relates to a forward osmosis system and process.

BACKGROUND OF THE INVENTION

Reduced internal concentration polarization and enhanced membrane performance can be important to increasing the efficiency and economics of forward osmosis processes.

SUMMARY

A forward osmosis system can alleviate internal concentration polarization and enhance membrane performance by applying an external force to a fluid on the feed side.

In one aspect, a forward osmosis fluid purification system which alleviates internal concentration polarization and enhances membrane performance includes a membrane module including a membrane; a feed side configured to contain a solution consisting of unpurified solvent; a pressure control system on the feed side capable of generating and applying an external pressure to a fluid on the feed side; and a draw side including a draw solute. In a further aspect, the pressure control system can include a pump on the feed side or a valve on the feed side. The membrane includes an active layer and a support layer, where the active layer is oriented so that it faces the draw side.

In another aspect, a process includes the steps of passing a fluid in a forward osmosis system from a feed solution with a first osmotic pressure, through a membrane into a draw solution having a draw solute with a second osmotic pressure, where the first osmotic pressure is lower than the second osmotic pressure, the membrane including an active layer and a support layer, and the membrane is oriented such that the active layer of the membrane faces a draw side, and the support layer faces a feed side; and applying an external force to the fluid on the feed side of the membrane. In a further aspect, the external force applied on the feed side is an external pressure between 0.25 bar to 20 bar, generated and controlled by a pressure control system.

Other aspects, embodiments, and features will be apparent from the following description, the drawings, and the claims.

DETAILED DESCRIPTION OF THE DRAWINGS

FIG. 1(a) is a schematic diagram of the process of a common forward osmosis (FO) setup.

FIG. 1(b) is a schematic diagram of the process of a FO system with a pressure control system incorporated within.

Figure 4A:
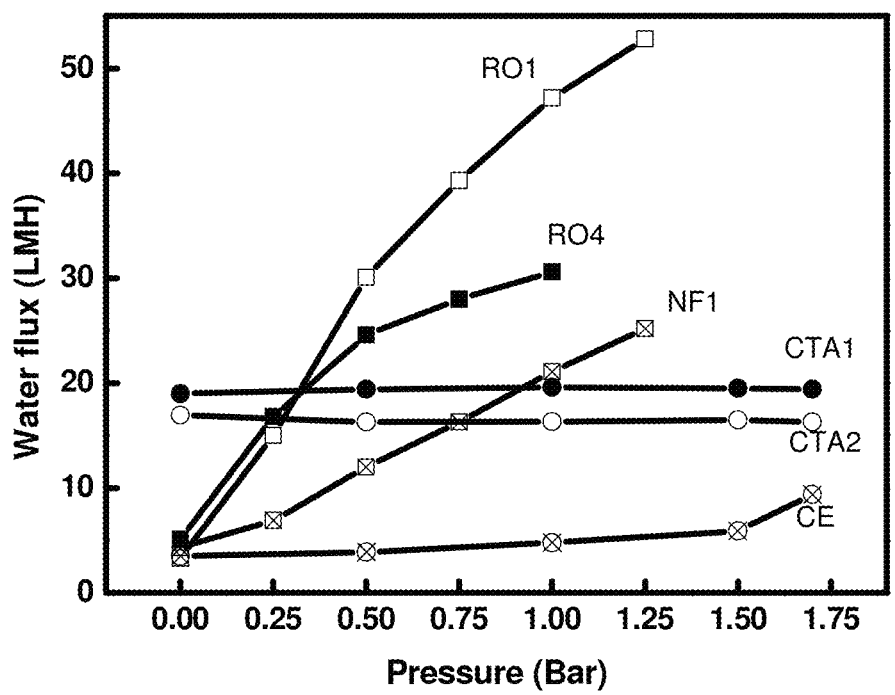
FIG. 4(a) is an illustration of various membranes' water flux at different applied pressures with 1.5 M NaCl as a draw solution (DS).
Figure 4B:
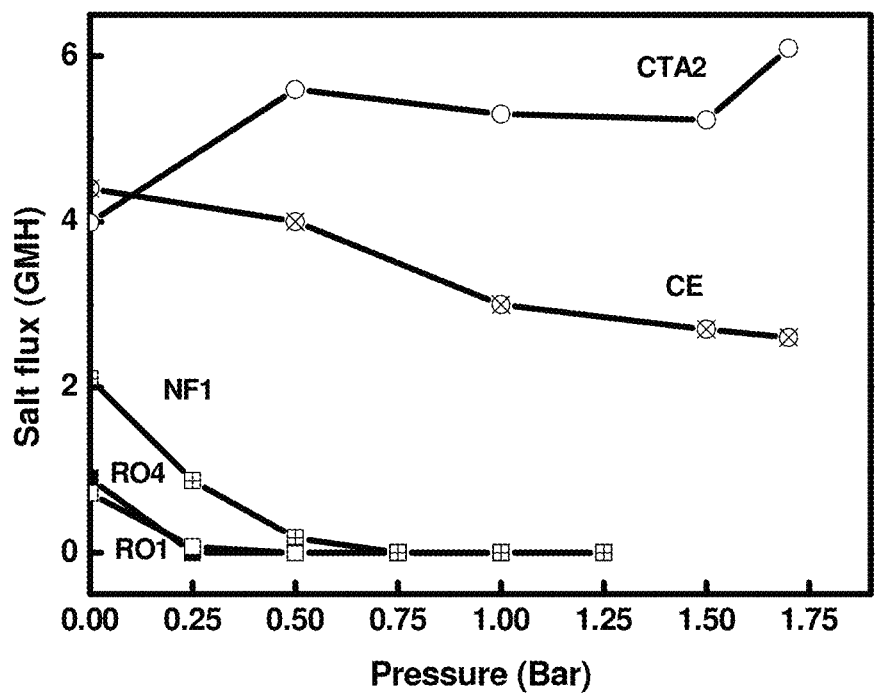
FIG. 4(b) is an illustration of various membranes' salt flux at different applied pressures with 1.5 M NaCl as a DS.
Figure 4C:
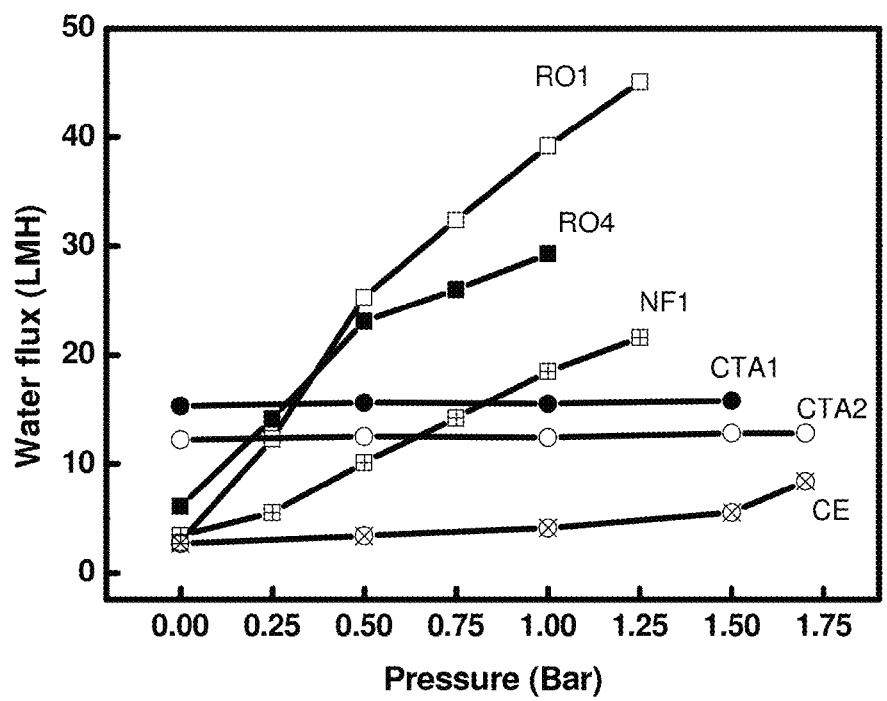
FIG. 4(c) is an illustration of the water flux of various membranes' water flux at different applied pressures with 1.0 M NaCl as a DS.
Figure 4D:
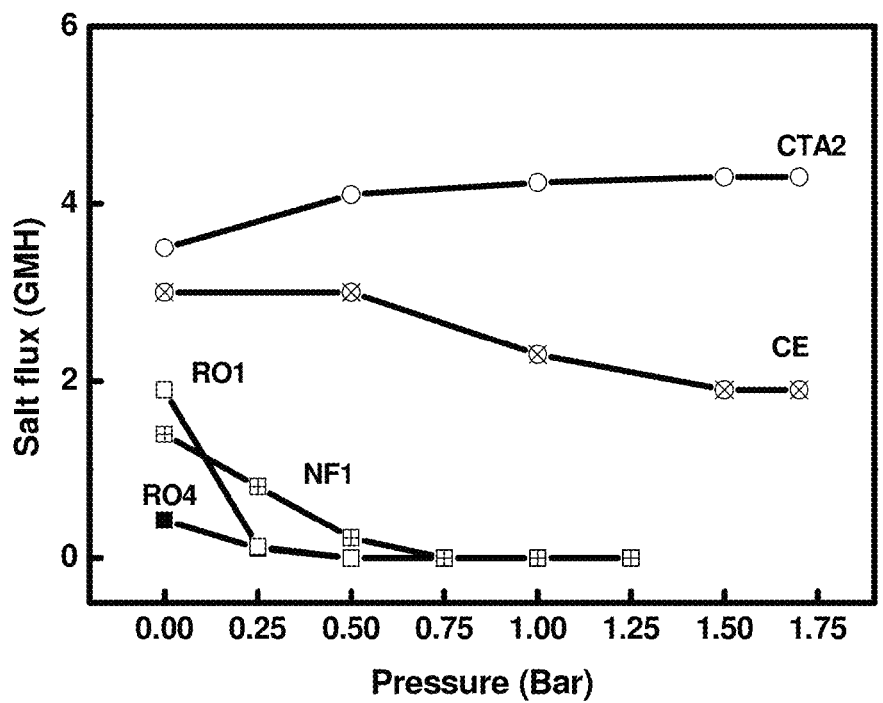
FIG. 4(d) is an illustration of the water flux of various membranes' salt flux at different applied pressures with 1.0 M NaCl as a DS.
Figure 4E:
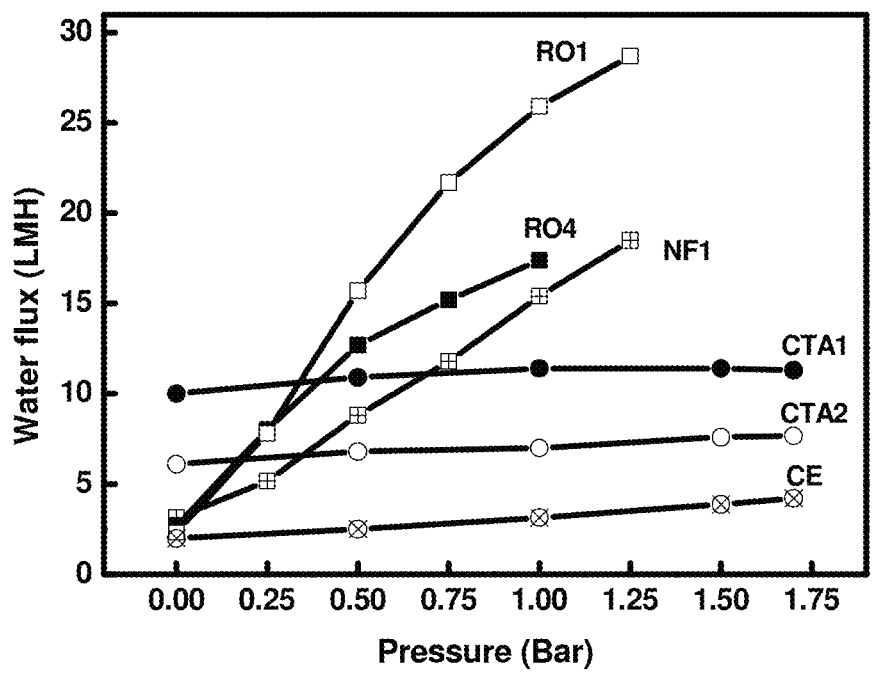

FIG. 4(e) an illustration of various membranes' water flux at different applied pressures with 0.5 M NaCl as a DS.

Figure 4F:
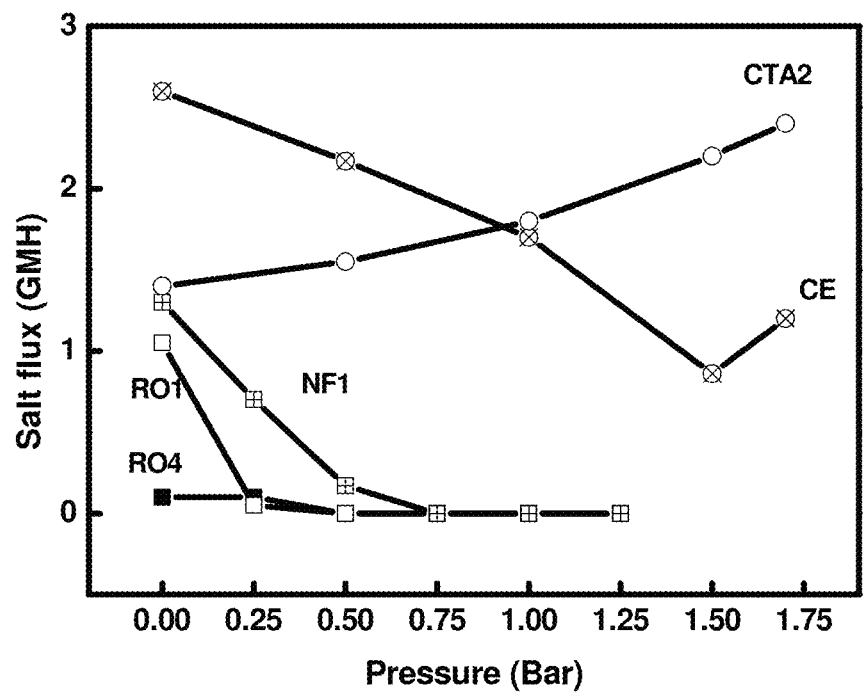

FIG. 4(f) an illustration of various membranes' salt flux at different applied pressures with 0.5 M NaCl as a DS.

Figure 4G:
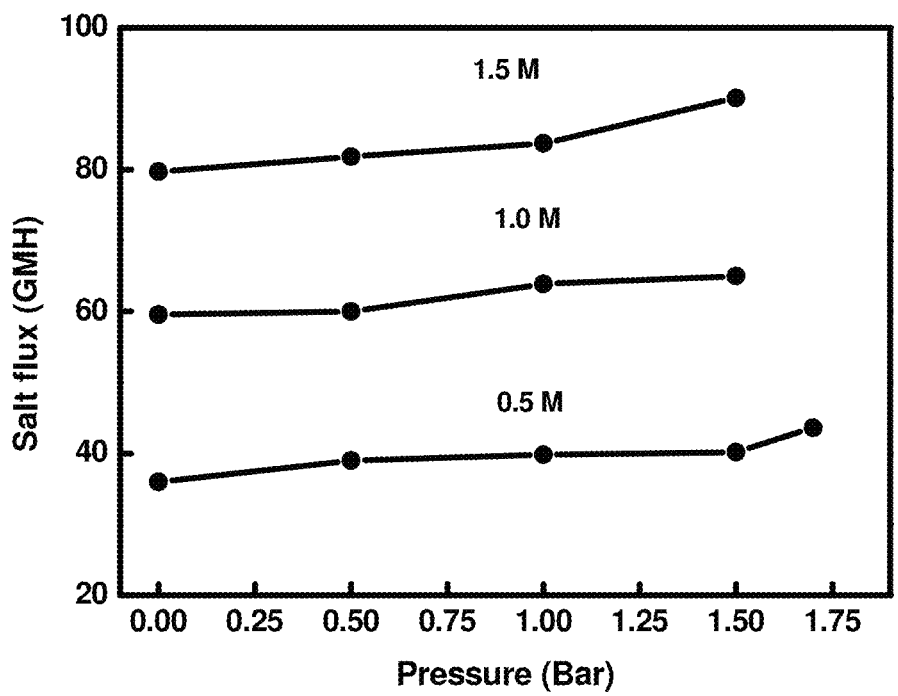

FIG. 4(g) an illustration of a CTA1 thin-film-composite membrane's salt flux at different applied pressures with deionized water (DI) as the feed solution.

Figure 5A:
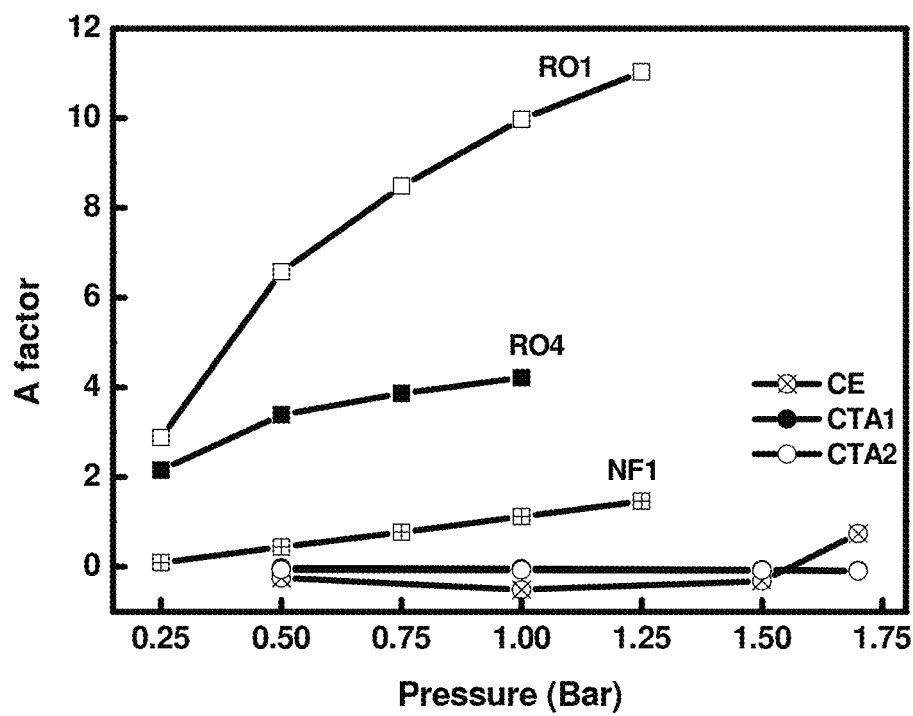

FIG. 5(a) is an illustration of the A factor of the pressure facilitated FO test with DI as the feed solution and 1.5 M NaCl as DS.

Figure 5B:
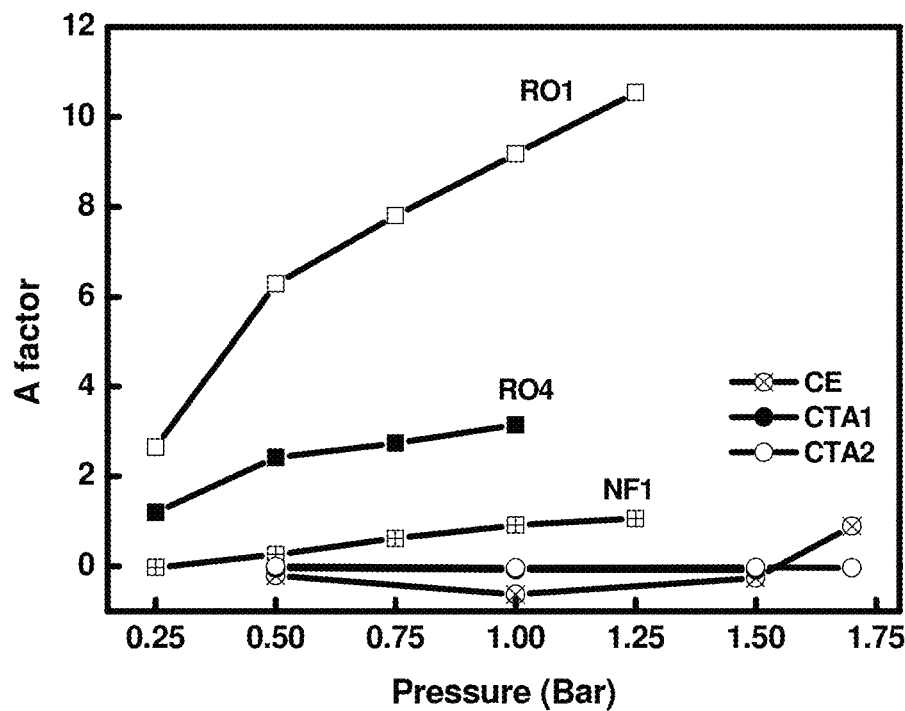

FIG. 5(b) is an illustration of the A factor of the pressure facilitated FO test with DI as the feed solution and 1.0 M NaCl as DS.

Figure 5C:
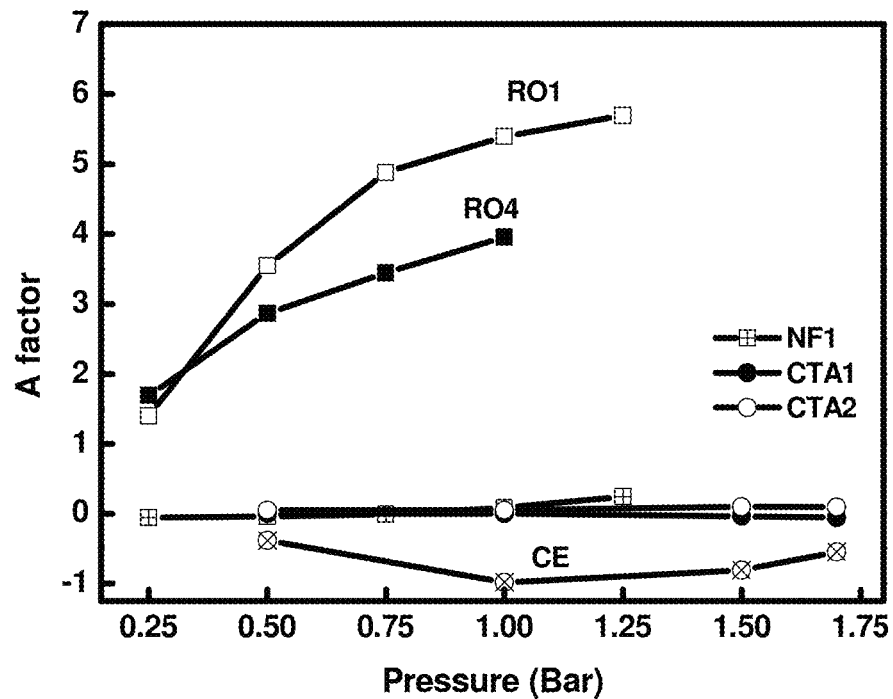

FIG. 5(c) is an illustration of the A factor of the pressure facilitated FO test with DI as the feed solution and 0.5 M NaCl as DS.

Figure 6A:
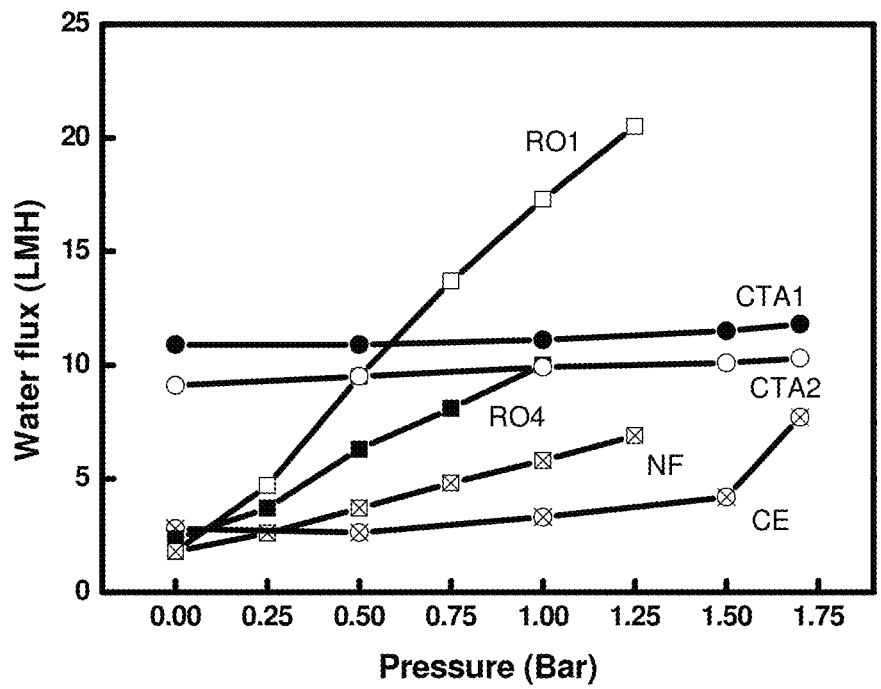

FIG. 6(a) is an illustration of water flux of a pressure facilitated FO test with 2000 ppm NaCl as feed solution, where the DS is 1.5 M NaCl.

Figure 6B:
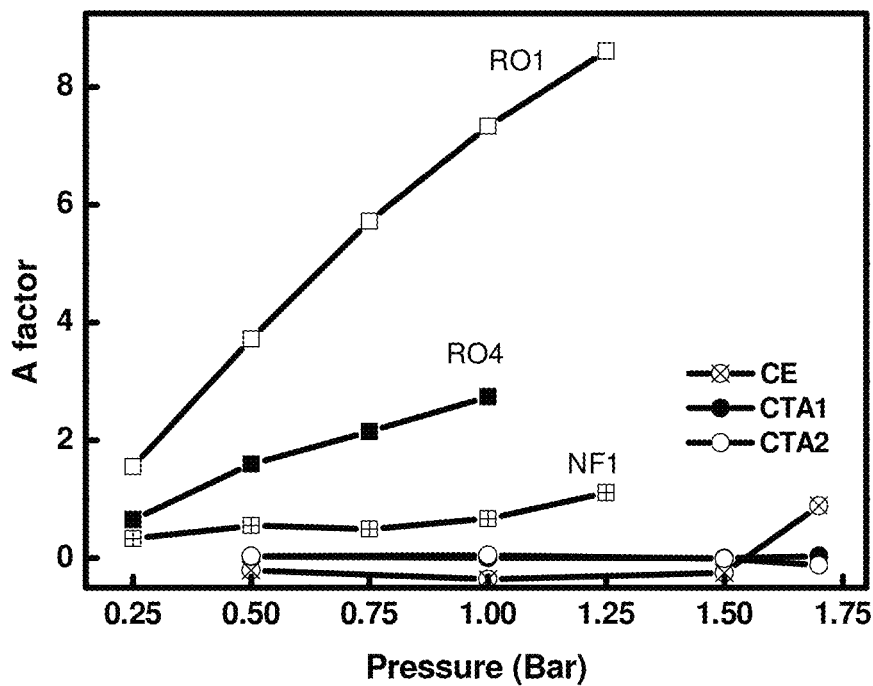

FIG. 6(b) is an illustration of the A factor of the pressure facilitated FO test with 2000 ppm NaCl as the feed solution, where the DS is 1.5 M NaCl.

Figure 7A:
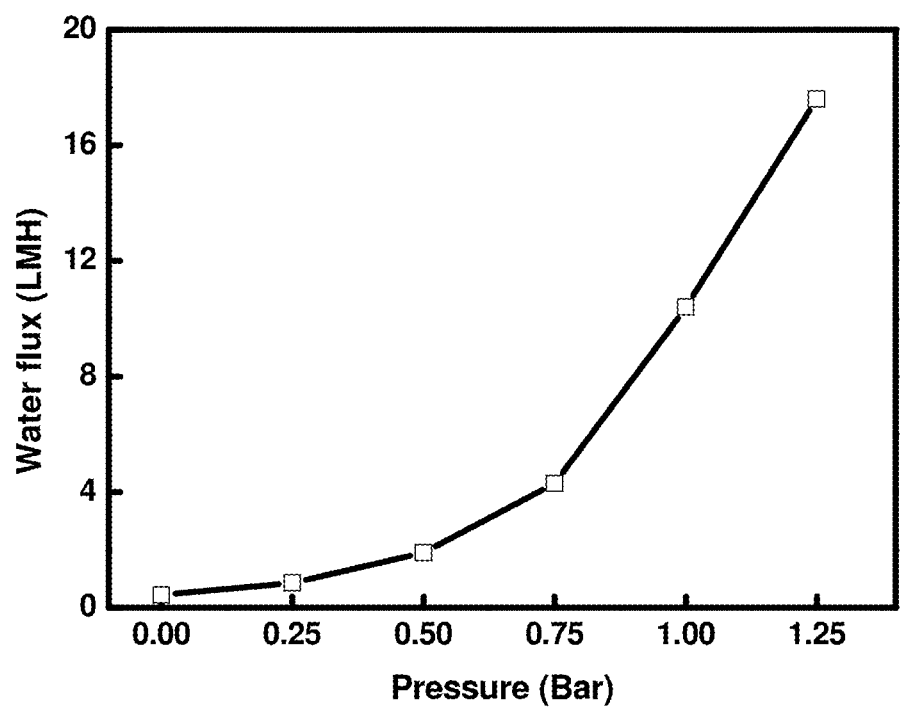

FIG. 7(a) is an illustration of water flux in a pressure facilitated FO test using a RO1 membrane with 0.5 M NaCl as feed solution, where the DS is 1.5 M NaCl.

Figure 7B:
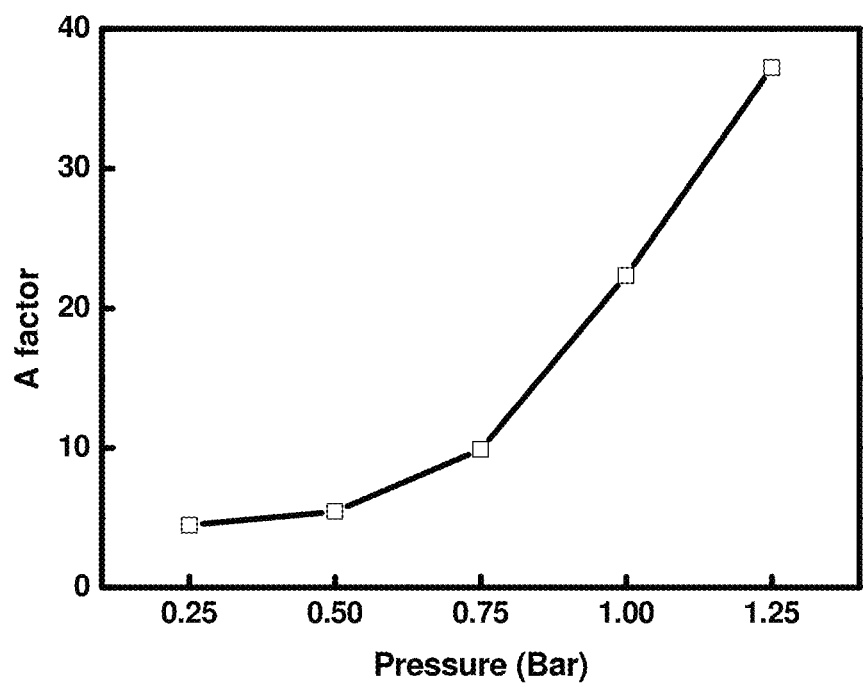

FIG. 7(b) is an illustration of the A factor in a pressure facilitated FO test using a RO1 membrane with 0.5 M NaCl as feed solution, where the DS is 1.5 M NaCl.

DETAILED DESCRIPTION OF THE INVENTION

Forward osmosis (FO) is a process utilizing the osmotic pressure difference generated by concentration difference as the driving force, to get solvent from a less concentrated solution to a greater concentrated one through a semipermeable membrane. Related research dates back to 1960s, and several prototype ideas were proposed in that decade: $NH_4HCO_3$ or $(NH_4)_2CO_3$ based seawater desalination, wastewater concentration, life emergence bag, fertilizer based desalination, and pressure retarded osmosis to generate power. However, few prototypes were carried out commercially because of the low performance of membrane, except for the life emergence bag by Hydration Technology Innovations (HTI) with their patented first commercial FO membrane in 1997. (See R. A. Neff, Potable water by solvent extraction, U.S. Pat. No. 3,130,156 (1964); G. W. Batchelder, Demineralization of water, U.S. Pat. No. 3,171, 799 (1965); D. N. Glew, Process for liquid recovery and solution concentration, U.S. Pat. No. 3,216,930 (1965); Desalination of seawater, FR2102763 (1972); D. K. Anderson, *Concentration of dilute industrial wastes by Direct osmosis*, University of Rhode Island, 1977; R. E. Kravath, J. A. Davis, *Desalination of Sea-Water by Direct Osmosis*, Desalination, 16 (1975) 151-155; J. O. Kessler, C. D. Moody, *Reclamation of brackish waters for irrigation: optimization of process parameters for fertilizer-driven osmosis*, Univ. Arizona, 1977, pp. 56; S. Loeb, *Production of Energy from Concentrated Brines by Pressure-Retarded Osmosis.* 1.

*Preliminary Technical and Economic Correlations*, Journal of Membrane Science, 1 (1976) 49-63; S. Loeb, et al., *Production of Energy from Concentrated Brines by Pressure-Retarded Osmosis*. 2. *Experimental Results and Projected Energy Costs*, Journal of Membrane Science, 1 (1976) 249-269; E. G. Beaudry, J. R. Herron, Asymmetric supported hydrophilic membrane for direct osmotic concentration (DOC) and its casting, WO9733681A1 (1997), each of which is incorporated by reference in its entirety.)

Compared with reverse osmosis (RO), FO requires little energy input and allows high water recovery. (See R. L. McGinnis, M. Elimelech, *Energy requirements of ammonia-carbon dioxide forward osmosis desalination*, Desalination, 207 (2007) 370-382; C. R. Martinetti, et al., *High recovery of concentrated RO brines using forward osmosis and membrane distillation*, Journal of Membrane Science, 331 (2009) 31-39, each of which is incorporated by reference in its entirety.) Due to today's energy crisis, FO has once more come into focus in the past few years because it is viewed as a possible alternative to the energy-intensive hydraulic pressure driven process. Many developments have been made either in the novel membrane design or application fields. (See T. Y. Cath, et al., *Forward osmosis: Principles, applications, and recent developments*, Journal of Membrane Science, 281 (2006) 70-87; N. Y. Yip, et al., *High Performance Thin-Film Composite Forward Osmosis Membrane*, Environmental Science & Technology, 44 (2010) 3812-3818; J. T. Arena, et al., *Surface modification of thin film composite membrane support layers with polydopamine: Enabling use of reverse osmosis membranes in pressure retarded osmosis*, Journal of Membrane Science, 375 (2011) 55-62; N.-N. Bui, et al., *Electrospun nanofiber supported thin film composite membranes for engineered osmosis*, J. Membr. Sci., 385-386 (2011) 10-19; R. Wang, et al., *Characterization of novel forward osmosis hollow fiber membranes*, Journal of Membrane Science, 355 (2010) 158-167; X. X. Song, et al., *Nano Gives the Answer: Breaking the Bottleneck of Internal Concentration Polarization with a Nanofiber Composite Forward Osmosis Membrane for a High Water Production Rate*, Adv Mater, 23 (2011) 3256; K. B. Petrotos, et al., *Direct osmotic concentration of tomato juice in tubular membrane-module configuration. II. The effect of using clarified tomato juice on the process performance*, Journal of Membrane Science, 160 (1999) 171-177, each of which is incorporated by reference in its entirety.)

Generally, low water flux is regarded as the main obstacle of commercializing FO-related applications with an underlying cause of internal concentration polarization (ICP) inside the membrane which reduces the osmotic driving force. (See J. R. McCutcheon, M. Elimelech, *Influence of concentrative and dilutive internal concentration polarization on flux behavior in forward osmosis*, Journal of Membrane Science, 284 (2006) 237-247, incorporated by reference in its entirety). Commercial polyamide (PA)-based thin-film-composite (TFC) RO membrane and cellulose acetate (CA)-based RO membrane are examples of severe ICP problems in FO testing, due to the membrane structure designed to withstand the high hydraulic pressure. Many groups proposed different routes to solve this problem. HTI manufactured the only commercially available FO membranes using cellulose acetate based materials by reducing the membrane thickness to 50-100 um. (E. G. Beaudry, et al.) Yale proposed to use the finger-like structure within the support to provide a direct route for the solution to reach the separating layer. (N. Y. Yip, et al.) Jeffery made the PSF support layer hydrophilic by dipping it in a polydopamine solution. (J. T. Arena, et al.) Song and Jeffery used electrospun fibre as support. (X. X. Song, et al.; N.-N. Bui, et al.) Wang combined the fingerlike structure with hollow fibre morphology. (R. Wang et al.)

Prior attempts to alleviate the problem of ICP using a combination of FO and RO have not yet been fully optimized. Choi et al. combined FO and RO but oriented the membrane so that the active layer faced the feed side of the FO system. (See Choi, Y J, et al., *Toward a combined system of forward osmosis and reverse osmosis for seawater desalination*, Desalination, 247 (2009) pp. 239-246, incorporated by reference in its entirety.)

A forward osmosis fluid purification system and a process for extracting water from wastewater or seawater while reducing ICP and enhancing membrane performance can be achieved based on the application of applying an external force, which can be a small additional pressure, to a feed side containing a solution with a solute, which acts as a supplemental force in addition to the driving force created by the osmotic pressure gradient. In other words, the applied external force is similar to the force used in reverse osmosis that supplements the osmotic pressure gradient force in which a lesser osmotic pressure on the draw side of the membrane causes the water on the feed side of the membrane with a greater osmotic pressure to be pulled through the membrane onto the draw side.

An external force can be applied by a pressure control system. The pressure control system can be a pump on the feed side of the membrane, which applies a supplemental force on the feed solution. The pressure control system can also be a valve located in a feed solution outlet channel on the feed side of the membrane, which can apply a supplemental pressure on the feed solution.

The applied external force can be between 0.25 bar to 20 bar.

The membrane orientation also affects the internal concentration polarization and enhances the performance of the membrane. A membrane can have an active layer and a support layer. The internal concentration polarization is reduced in a system where the active layer of the membrane faces the draw side.

A forward osmosis process where an external force is applied to a fluid on the feed side of the membrane can be useful for seawater desalination. As people need a continuous supply of fresh water, this process can create fresh water with less energy than previously developed osmosis processes. This process is advantageous because it saves energy as compared to other seawater desalination processes.

Another use for the forward osmosis process described here is for wastewater treatment. This process can remove the water from harmful solutes. This process is advantageous because it saves energy as compared to other processes of wastewater treatment.

Yet another use for the forward osmosis system described here is for fruit juice concentration. This process allows fruit juice to be concentrated by removal of the water in the juice. This process also helps to preserve the aroma without involving heat.

As shown in FIG. 1(*a*), a common FO setup has a higher concentration (or higher osmotic pressure) solution, designated as draw solution (DS) and a lower concentration (or lower osmotic pressure) solution (designated as feed or feed solution) introduced by pumps from a DS inlet (101) and a feed inlet (102) into a membrane module (103) which could be plate of the frame, spiral wound, or hollow fiber, where the solvent, which could be water, diffuses from the feed solution to the DS. The solutions then exit the membrane module (103); the draw solution exits through a DS outlet (104) and the feed solution exits through a feed outlet (105). In a traditional embodiment, no additional pressure is applied in the feed, and the pressure difference between the DS and the feed is less than 0.2 bar. In another embodiment, for a pressure retarded FO process, additional pressure is applied on the DS side to push a turbine to generate power with no additional pressure on the feed side.

In one aspect, a possible method to alleviate the ICP in FO applications is to apply an external pressure in the feed side to generate an extra water flux. As shown in FIG. 1(b), by incorporating a pressure control system (106), which could be a valve, the pressure on the feed side can be adjusted. The range of pressure that can be applied is from 0.25 bar to 20 bar, preferably from 0.5 bar to 18 bar, or from 1 bar to 12 bar. For example, the applied pressure can be from 1 bar to 10 bar. By applying a higher pressure on the feed side, e.g. 0.25 bar to 20 bar, the thin-film-composite membranes' performance can be enhanced more than 10 times with the active layer facing the DS. The membrane module (103) could be the plate of the frame, spiral wound, or hollow fiber. The membrane type is a thin film composite membrane, which has an active layer on top of a porous support with or without a backing layer.

Figure 2:
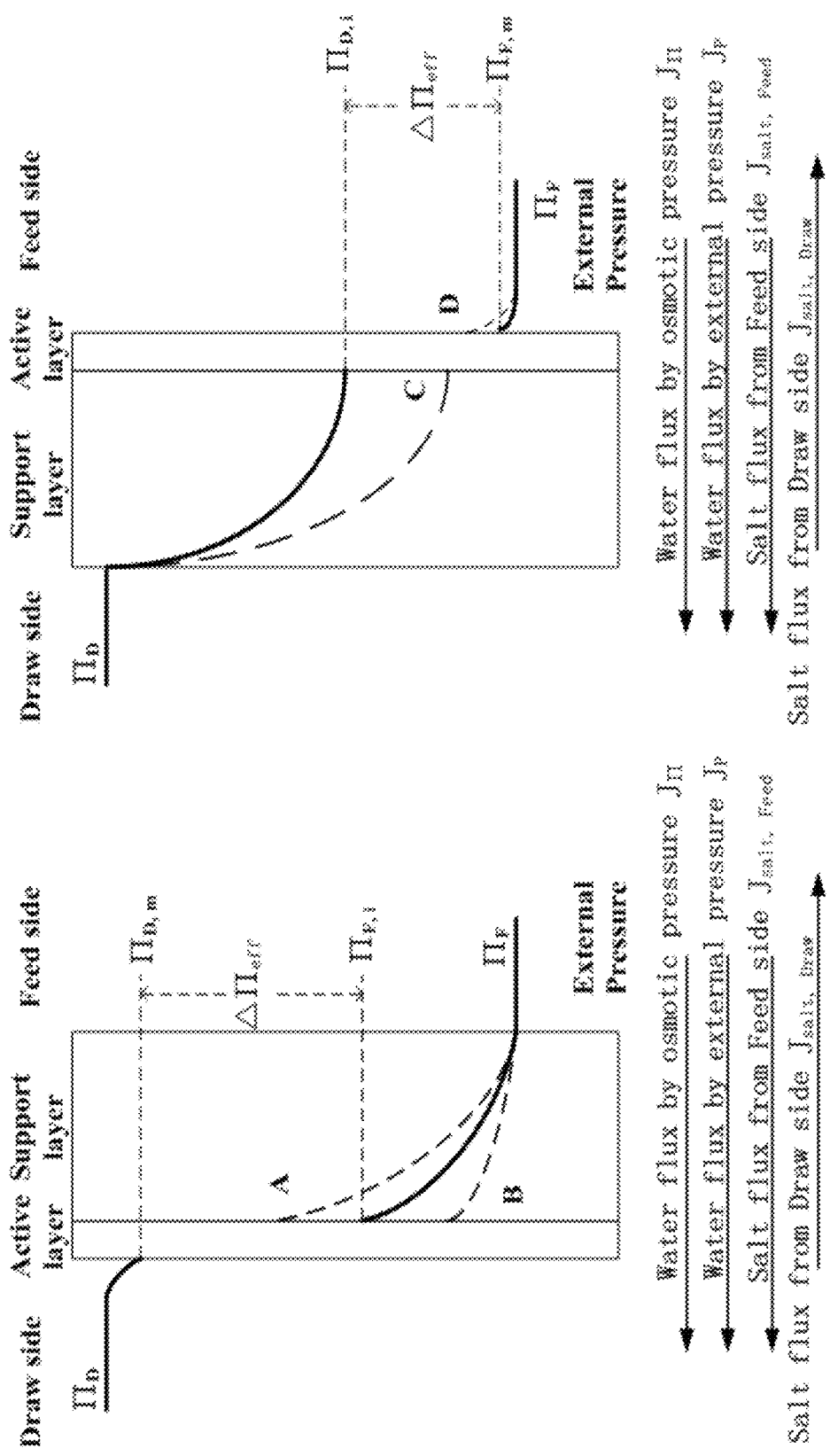
FIG. 2 is an illustration of osmotic driving force profiles for osmosis through thin-film-composite membranes with and without external pressure in different orientations.

As shown in FIG. 2, the solid line represents the osmotic pressure profile at steady stage without external pressure. Water flux occurs due to osmotic pressure, but also occurs when an external pressure is applied to the fluid in the feed solution. Salt flux occurs from the feed side to the draw side, and can also occur from the draw side to the feed side. When external pressure is applied, in the orientation of an active layer facing the draw solution (AL-DS), the extra water flux either make the salt more concentrated near the inner active layer region (as dashed line A shows), or make the salt less concentrated by pushing the salt across the membrane (as dashed line B shows), while the external concentration polarization (ECP) should not vary much in the DS side. In the orientation of active layer facing the feed side (AL-FD), there is more likely only one case: external concentration polarization on the feed side increases at an increasing rate of change (as dashed line D shows) because additional salt is retained at the surface, and internal concentration polarization on the draw side also increases at an increasing rate of change (as dashed line C shows) because additional water flushes out the salt, thus reducing the concentration.

EXPERIMENTAL METHODS

Membranes and Chemicals

Deionized water is used throughout the experiments. The sodium chloride used is of analytical grade. Membranes used are listed in Table 1.

TABLE 1

Membranes tested in this study

| Classification | Label | Material | Manufacturer |
|---|---|---|---|
| Seawater RO | RO4 | PA TFC | Sepro |
| | CE | CA on polyester fabric | Osmonics |
| Brackishwater RO | RO1 | PA TFC | Sepro |
| NF | NF1 | PA TFC | Sepro |
| FO | CTA1 | CTA on polyester mesh | HTI |
| | CTA2 | CTA on nonwoven fabric | HTI |

FO Performance Test

Figure 3:
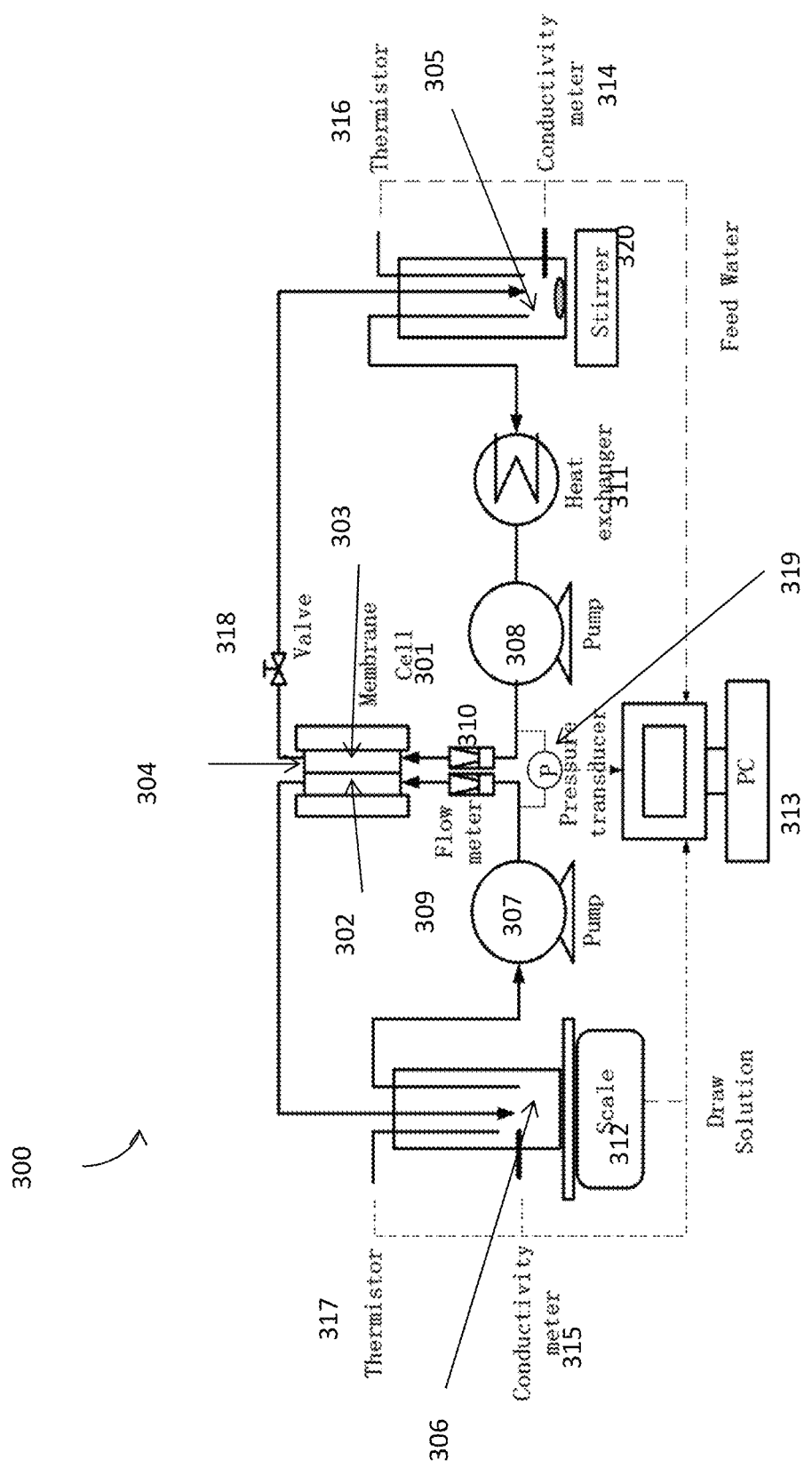
FIG. 3 is a schematic diagram of the laboratory-scale FO setup.

A schematic diagram of the laboratory scale unit (300) used in this study is shown in FIG. 3. The special designed cross-flow membrane cell (301) has a channel (302, 303) on each side of the membrane (304), which allows the feed solution (305) and draw solution (306) to flow through separately. Each channel has dimensions of 2.8, 50, and 100 mm for channel height, length, and width, respectively. Co-current flow was used with flow rate in each channel controlled by a peristaltic pump (307, 308) and a flow meter (309, 310). A heat exchanger (311) was used to maintain the feed and draw solutions at 23° C. A stirrer (320) on the feed side was also used. A weighing scale (312) connected to a computer (313) was used to monitor the weight of water permeating through the membrane from the feed to the draw side, from which the water flux was calculated. A conductivity meter (314) in the feed side was used to determine to salt concentration and thus the salt flux. A draw side conductivity meter (315) also exists to take measurements on the draw side. The laboratory scale unit (300) also comprises a feed-side thermistor (316) and a draw-side thermistor (317). The cross-flow rates for the feed and draw solution were maintained at 1.2 and 0.4 L/min respectively for the 'without pressure' test. The additional pressure on the feed side is generated and controlled by the pump (308) and the valve (318) on the feed side. The pressure is detected by a pressure transducer (319).

Results and Discussion

Pressure Generated Water Flux Jp Test

The pressure generated water flux Jp test is carried out in the FO test system, as shown in FIG. 3. DI water is used on the 'draw solution' side. Two 'feed side' solutions are used: DI and 2000 ppm NaCl. The external pressure is applied on the 'feed side.'

The pressure range is set as 0.25 bar to 1.7 bar. The top limit is due to the pressure transducer's detection limit. Cellulose acetate (CA) and cellulose triacetate (CTA) based membranes can withstand 1.7 bar; while with a polyamide (PA) based thin-film-composite membranes, the polysulfone layer may detach from the backing layer, and even break at higher pressures. An RO4 membrane is damaged at 1.25 bar; an RO1 membrane is damaged at 1.7 bar; and an NF1 membrane can withstand 1.7 bar.

Table 2 lists the results of the Jp test with DI as the feed solution. Polyamide-based thin-film-composite (RO4) and cellulose acetate on polyester fabric (CE) membranes are seawater RO membranes, and cellulose triacetate on polyester mesh (CTA1) and cellulose triacetate on nonwoven fabric (CTA2) are FO membranes which gave low water fluxes, while brackish water RO membrane made of polyamide thin-film-composite (RO1) and a NF membrane made of polyamide thin-film-composite (NF1) gave relatively high water fluxes.

Table 3 shows the performance of the Jp test with 2000 ppm NaCl in the feed solution. The water flux decreased a lot compared with the results with DI as feed solution. Generally, the RO1 and NF1 membranes gave higher water fluxes and salt fluxes. For RO4, the water flux is negative at 0.25 bar because the applied pressure is insufficient to push the water from the salty feed to the DI 'draw side.' Table 3 also lists the result of RO1 membrane with 0.5 M NaCl as feed.

TABLE 2

Water flux (LMH) generated external pressure
under blank conditions with DI in Feed

| Pressure (Bar) | RO4 | CE | RO1 | NF1 | CTA1 | CTA2 |
|---|---|---|---|---|---|---|
| 0.25 | 0.7 | — | 2.2 | 2.2 | 0.5 | 0.1 |
| 0.5 | 2.3 | 1.3 | 5.1 | 5.8 | 0.9 | 0.4 |
| 0.75 | 3.2 | — | 8.0 | 8.7 | 1.1 | 0.5 |
| 1 | 4.0 | 3.1 | 11.0 | 12.0 | 1.4 | 0.6 |
| 1.25 | Damaged | — | 13.1 | 14.6 | 1.6 | 0.7 |
| 1.5 | — | 3.5 | 17.5 | 17.4 | 1.8 | 0.9 |
| 1.7 | — | 3.3 | Damaged | 22.0 | 1.9 | 1.0 |

TABLE 3

Water flux (LMH) and salt flux (GMH) generated external pressure
under blank conditions with 2000 ppm NaCl in Feed

| Pressure (Bar) | RO4 | CE | RO1 | RO1* | NF1 | CTA1 | CTA2 |
|---|---|---|---|---|---|---|---|
| 0.25 | −0.2(0.2)[1] | — | 0.1(0.7) | −1.6(1.6) | 0.2(0.7) | — | — |
| 0.5 | 0.2(0.5) | 0.4(0.7) | 1.0(1.6) | −1.0(3.2) | 0.9(1.4) | −0.3(2.3) | 0.07(0.0) |
| 0.75 | 0.7(1.1) | — | 1.6(2.7) | −0.6(6.7) | 2.1(2.8) | — | — |
| 1 | 1.2(1.5) | 1.5(1.2) | 2.3(4.3) | −0.1(9.8) | 2.8(3.6) | 0.1(2.9) | 0.3(0.4) |
| 1.25 | — | — | 3.2(5.4) | 0.4(15.1) | 3.1(4.7) | — | — |
| 1.5 | — | 2.1(1.7) | — | — | — | 0.6(2.6) | 1.1(0.5) |
| 1.7 | — | 2.4(2.0) | — | — | — | 0.5(2.8) | 2.3(0.5) |

[1]'−0.2(0.2)' is 'water flux (salt flux)'; the negative water flux means the pressure is insufficient to push the water from the salty Feed to the DI 'Draw side'.
*the Feed side is 0.5M NaCl solution.

Pressure Facilitated FO Test with DI as Feed

To quantify the effect of external pressure on water flux, we define the water flux under pressure facilitated FO test:

$$J_{overall} = J_{\Pi,0} + J_P + \Delta J_\Pi$$

where $J_{overall}$ is the water flux under pressure facilitated FO test;

$J_{\Pi,0}$ is the water flux generated by osmotic pressure under FO test without pressure, $J_P$ is the water flux generated by external pressure under Pressure generated water flux Jp test, $\Delta J_\Pi$ is the water flux difference between $J_{overall}$ and $J_{\Pi,0} + J_P$, and $A = \Delta J_\Pi / J_{\Pi,0}$, where A represents the influence of the external pressure on the ICP.

FIGS. 4(a)-(f) shows the membranes' performance at different pressures applied on the feed solution, or feed pressures, with 1.5 M, 1.0 M and 0.5 M NaCl as DS and DI as the feed solution. FIG. 4(a) illustrates the feed pressure's effect on the water flux using various membranes in a FO test with DI as the feed solution and 1.5 M NaCl as the draw solution. Similarly, FIG. 4(b) illustrates the feed pressure's effect on the salt flux using various membranes in a FO test with DI as the feed solution and 1.5 M NaCl as the draw solution. FIG. 4(c) illustrates the feed pressure's effect on the water flux using various membranes in a FO test with DI as the feed solution and 1.0 M NaCl as the draw solution. FIG. 4(d) illustrates the feed pressure's effect on the salt flux using various membranes in a FO test with DI as the feed solution and 1.0 M NaCl as the draw solution. FIG. 4(e) illustrates the feed pressure's effect on the water flux using various membranes in a FO test with DI as the feed solution and 0.5 M NaCl as the draw solution. FIG. 4(f) illustrates the feed pressure's effect on the salt flux using various membranes in a FO test with DI as the feed solution and 0.5 M NaCl as the draw solution. All the membranes showed the same trend either in water flux or salt flux with increasing the pressure at different DS concentrations. Generally, there are three groups, categorized by membrane performance: Group I includes PA-based thin-film-composite membranes RO1, RO4, and NF1; Group II includes CTA-based FO membranes CTA1 and CTA2; and Group III is includes a CA-based membrane CE. With increasing the pressure, Group I experienced a sharp increase in water flux and a decrease to zero in salt flux; Group II remained roughly the same in water flux and slightly increased in salt flux; Group III increased slightly in water flux and decreased slightly in salt flux.

It is common that higher DS concentration yields higher water flux and higher salt flux. In view that the trend is roughly the same at different DS concentrations, the case of using 1.5 M NaCl as a DS is discussed in detail. At the zero point (without external pressure), FO membranes outperformed the other membranes in water flux, where CTA1 and CTA2 membranes gave around 20 LMH, while the other membranes gave less than 5 LMH. However, the FO membranes also gave high salt fluxes, where CTA1 membrane gave around 80 GMH (as FIG. 4(g) shows) and CTA2 gave 4 GMH, while RO4 and RO1 membranes gave less than 1 GMH.

With 0.25 bar pressure, the water fluxes increased for Group I membranes, and the salt fluxes decreased. For RO1 and RO4 membrane, the water flux increased to around 20 LMH, reaching the level of CTA1 and CTA2 membranes.

With increasing the feed pressure, Group I membrane outperformed the CTA1, CTA2 membrane in water flux, and the salt flux decreased to zero. Water flux for RO1 reached 50 LMH with a feed pressure 1.25 bar.

FIG. 4(g) illustrates the salt flux of a thin-film-composite membrane at different feed pressures with DI as the feed solution and 1.5 M NaCl as the draw solution.

FIGS. 5(a)-(c) show the A factor of the pressure facilitated FO test with DI as the feed solution and varying concentrations of NaCl as the draw solution. FIG. 5(a) shows the A factor when 1.5 M NaCl is the draw solution. FIG. 5(b) shows the A factor when 1.0 M NaCl is the draw solution. FIG. 5(c) shows the A factor when 0.5 M NaCl is the draw solution. The osmotic driven process is enhanced by the additional pressure on the feed side for Group I membranes. For RO1, the A factor ranges from 2 to 11 which means the osmotic driven water flux is enhanced between 2 and 11 times.

Pressure Facilitated FO Test with Presence of Salt in the Feed Solution

To investigate the pressure facilitated FO process with salty feed, 2000 ppm NaCl solution is used as the feed with 1.5 M NaCl as draw solution.

FIG. 6(a) is an illustration of water flux of pressure facilitated FO tests performed with 2000 ppm NaCl as the feed solution and 1.5 M NaCl as the draw solution, for various membranes including RO1, RO4, CTA1, CTA2, NF, and CE.

Water fluxes for Polyamide-based thin-film-composite membranes increased with increasing the feed pressure, among which RO1 increased from less than 5 LMH to 20 LMH, where the FO membranes CTA1, CTA2 gave around 10 LMH.

FIG. 6(b) is an illustration of the A factor of pressure facilitated FO tests performed with 2000 ppm NaCl as the feed solution and 1.5 M NaCl as the draw solution, for various membranes including RO1, RO4, CTA1, CTA2, NF, and CE. It shows that the osmotic driven process for RO1 membrane increased 2-8 times with pressure on the feed side.

An experiment with 0.5 M NaCl as feed was also conducted with 1.5 M NaCl as draw solution for RO1 membrane.

FIG. 7(a) is an illustration of water flux in a pressure facilitated FO test using a RO1 membrane with 0.5 M NaCl as feed solution and a draw solution of 1.5 M NaCl. With additional pressure, water flux was less than 1 LMH. With increasing the pressure, water flux started to increase slowly with pressure 0.25-0.75 bar, and then increased quickly from 0.75-1.25 bar. At 1.25 bar, it reached 17 LMH.

FIG. 7(b) is an illustration of the A factor in a pressure facilitated FO test using a RO1 membrane with 0.5 M NaCl as feed solution and a draw solution of 1.5 M NaCl. It can be seen that the osmotic driven process is enhanced by nearly 40 times.

CONCLUSIONS

Low water flux is a major problem for forward osmosis related applications. Internal concentration polarization (ICP) is generally believed as the reason for this. In this invention, a novel process method, which is applying an external pressure on the feed side, is proven effective in enhancing the membrane performance. With either DI water or salty water as feed, thin film composite membranes which includes an active layer and a support layer show significant improvement in water flux with the active layer facing the draw solution. The osmotic driven process is enhanced 10%-400%, depending on the external pressure and feed concentration.

Other embodiments are within the scope of the following claims.

What is claimed is:

1. A process comprising the steps of:
    passing a fluid in a forward osmosis system from a feed solution with a first osmotic pressure, through a membrane into a draw solution comprising a draw solute with a second osmotic pressure, wherein the first osmotic pressure is lower than the second osmotic pressure, the membrane including an active layer and a support layer, and the membrane is oriented such that the active layer of the membrane faces a draw side, and the support layer faces a feed side; and
    applying an external force to the fluid on the feed side of the membrane.

2. The process of claim 1 wherein the external force applied on the feed side is an external pressure generated and controlled by a pressure control system.

3. The process of claim 1 wherein the pressure applied on the feed side is between 0.25 bar to 20 bar.

4. A process according to claim 1 wherein the membrane is a thin film composite membrane, a cellulose acetate-based dense membrane, or a cellulose triacetate based dense membrane.

5. A process according to claim 4, wherein the membrane is a thin film composite membrane, in which the support layer is a porous support layer with or without a backing layer.

6. A process according to claim 1 whereby flux of a solvent is increased by 10% to 400% of a flux of the solvent in which no additional pressure is applied.

7. A forward osmosis fluid purification system which alleviates internal concentration polarization and enhances membrane performance comprising:
    a membrane module including a membrane;
    a feed side configured to contain a solution consisting of unpurified solvent;
    a pressure control system on the feed side generating and applying an external pressure of 0.25 bar to 20 bar on the feed side; and
    a draw side including a draw solute, wherein the membrane comprises an active layer and a support layer and the active layer faces the draw side and the external pressure on the feed side being higher than a pressure on the draw side.

8. A system according to claim 2 further comprising a channel on each side of the membrane, which allows a feed solution and a draw solution to flow through separately.

9. A system according to claim 8 wherein the feed solution flows through a feed side channel.

10. A system according to claim 8 wherein the draw solution flows through a draw side channel.

11. The system of claim 9 wherein the pressure control system comprises a pump on the feed side.

12. The system of claim 9 wherein the pressure control system comprises a valve on the feed side.

13. The system of claim 7 wherein the membrane is a thin film composite membrane, a cellulose acetate-based dense membrane, or a cellulose triacetate based dense membrane.

14. The system of claim 13, wherein the membrane is a thin film composite membrane, in which the support layer is a porous support layer with or without a backing layer.

15. The system of claim 7, wherein the membrane module is the plate of the frame, spiral wound, or hollow fiber.

* * * * *